United States Patent
Gersmann et al.

(10) Patent No.: US 7,762,608 B2
(45) Date of Patent: Jul. 27, 2010

(54) VEHICLE WITH A TRUNK

(75) Inventors: Klaus Gersmann, Munich (DE); Andreas Clausen-Schaumann, Bernried (DE); David Evans, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/428,033

(22) Filed: Apr. 22, 2009

(65) Prior Publication Data
US 2009/0200827 A1 Aug. 13, 2009

Related U.S. Application Data

(63) Continuation of application No. PCT/EP2007/009281, filed on Oct. 25, 2007.

(30) Foreign Application Priority Data

Nov. 2, 2006 (DE) .................. 10 2006 051 645

(51) Int. Cl.
*B62D 25/10* (2006.01)
*B62D 25/12* (2006.01)
(52) U.S. Cl. .................. 296/76; 296/146.11; 296/146.8; 296/57.1; 296/51
(58) Field of Classification Search .................. 296/50, 296/51, 57.1, 26.01, 26.08, 26.11, 76, 146.8, 296/146.11
See application file for complete search history.

(56) References Cited

U.S. PATENT DOCUMENTS

| 3,398,985 | A | | 8/1968 | Rhoades |
| 6,095,585 | A | * | 8/2000 | Pilhall ........................ 296/26.1 |
| 6,926,326 | B2 | * | 8/2005 | Iyoda et al. .................. 293/149 |
| 7,360,818 | B1 | * | 4/2008 | Jeon ........................... 296/51 |
| 7,401,832 | B2 | * | 7/2008 | Yui et al. .................... 296/57.1 |
| 7,533,922 | B1 | * | 5/2009 | Krajenke .................... 296/57.1 |
| 2009/0021039 | A1 | * | 1/2009 | Quigley et al. .............. 296/57.1 |

FOREIGN PATENT DOCUMENTS

DE 199 22 399 A1 11/2000
FR 2 798 952 A1 3/2001

OTHER PUBLICATIONS

International Search Report dated Feb. 14, 2008 w/English translation (four (4) pages).

* cited by examiner

*Primary Examiner*—Patricia L Engle
(74) *Attorney, Agent, or Firm*—Crowell & Moring LLP

(57) ABSTRACT

A motor vehicle includes a trunk, in which the trunk has a body cutout opening which can be closed off by a two-part trunk lid which is composed of an upper trunk lid and a lower trunk lid. The upper trunk lid can be pivoted downward by an angle from, in each case, one closed position into, in each case, one open position. The lower trunk lid has at least one pivot lever, which is arranged such that it can be pivoted by way of a pivot axle formed on a lower body section. In the open position of the lower trunk lid, the pivot lever is in engagement with the lower body section.

18 Claims, 5 Drawing Sheets

VEHICLE WITH A TRUNK

CROSS-REFERENCE TO RELATED APPLICATIONS

This application is a continuation of PCT International Application No. PCT/EP2007/009281, filed Oct. 25, 2007, which claims priority under 35 U.S.C. §119 to German Patent Application No. 10 2006 051 645.1, filed Nov. 2, 2006, the entire disclosures of which are herein expressly incorporated by reference.

BACKGROUND AND SUMMARY OF THE INVENTION

The invention concerns a vehicle with a trunk, in which the trunk has a body cutout opening which can be closed-off via at least one trunk lid. The corresponding trunk lid is connected to the auto body via at least one hinge.

The goal of the invention is to provide a vehicle with a trunk, having a lower trunk lid, wherein the lower trunk lid has high stability under load in the opened state. The trunk may provide luggage space in the vehicle.

The vehicle according to the invention has a trunk with a cutout opening in an auto body, which can be closed by a two-part trunk lid. The two-part trunk lid consists of an upper trunk lid or lid and a lower trunk lid. The corresponding trunk lid is connected to the auto body via at least one hinge.

In a preferred variant, in the closed position, the upper trunk lid is essentially arranged in a horizontal position, in which the upper trunk lid can be sloped toward the vehicle rear. The lower trunk lid in the closed position has an essentially vertical position arrangement, in which the lower trunk lid can be sloped toward the vehicle. The upper trunk lid can be pivoted upward by an angle β and the lower trunk lid can be pivoted downward by an angle α from the corresponding closed position into the corresponding opened position.

The lower trunk lid according to the invention has at least one pivot lever, which can be arranged to pivot via a pivot axis formed on a lower auto body section. The pivot lever engages in the opened position of the lower trunk lid with the lower auto body section. By the arrangement of the pivot lever according to the invention, stiffening of the lower trunk lid in the opened position is achieved in simple fashion.

In an advantageous variant, the pivot lever has a lower pivot arm, on whose free end a stop is arranged, which lies against a stop in the opened position of the lower trunk lid, which is provided on an auto body wall of the lower auto body section.

Advantageously, at least one first locking component is arranged to pivot around a pivot axis on the auto body section. At least a second locking component is also provided on the lower trunk lid, which, in the opened position of the lower trunk lid, engages in shape-mated fashion with the corresponding first locking component. In the locked position of the locking components, tensile forces can therefore be taken up via the locking components, which can be directly introduced via the locking components into the auto body section from the trunk lid situated in the opened position.

The pivot lever, in an advantageous variant, has an upper pivot arm, which is fastened to the lower trunk lid.

A cavity is formed in the lower trunk lid, in which a transverse profile is arranged, on which the upper pivot arm of the pivot lever is fastened. Impact forces introduced to the vehicle rear can be taken up by the transverse profile.

In an advantageous variant, a section with an essentially U-shaped trend is formed on the upper pivot arm, designed so that the upper pivot arm can be pivoted from the cavity of the lower auto body section and back into the cavity.

The lower trunk lid advantageously has mechanisms for suspension and cushioning, which support opening and/or closing of the lower trunk lid.

In an advantageous variant, mechanisms are provided that produce a torque on the locking component, so that the locking component pivots in the opening direction of the lower trunk lid.

A hook-like section is advantageously formed on the free end of the first locking component, which is arranged on the auto body section. A hook-like section is also formed on a free end of the second locking component fastened to the trunk lid. The two hook-like sections are designed and arranged relative to each other, so that the two hook-like sections of the locking components are in shape-mated engagement with each other in a locked position.

At least one stop is provided on the auto body section in an advantageous variant, in which a hook-like section is formed on the corresponding stop. A stop on the end of the corresponding first locking component is advantageously provided opposite the corresponding stop on the auto body section, which has a hook-like section. In the opened position of the lower trunk lid, the hook-like sections of the opposite stops engage with each other or at least lie against each other.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
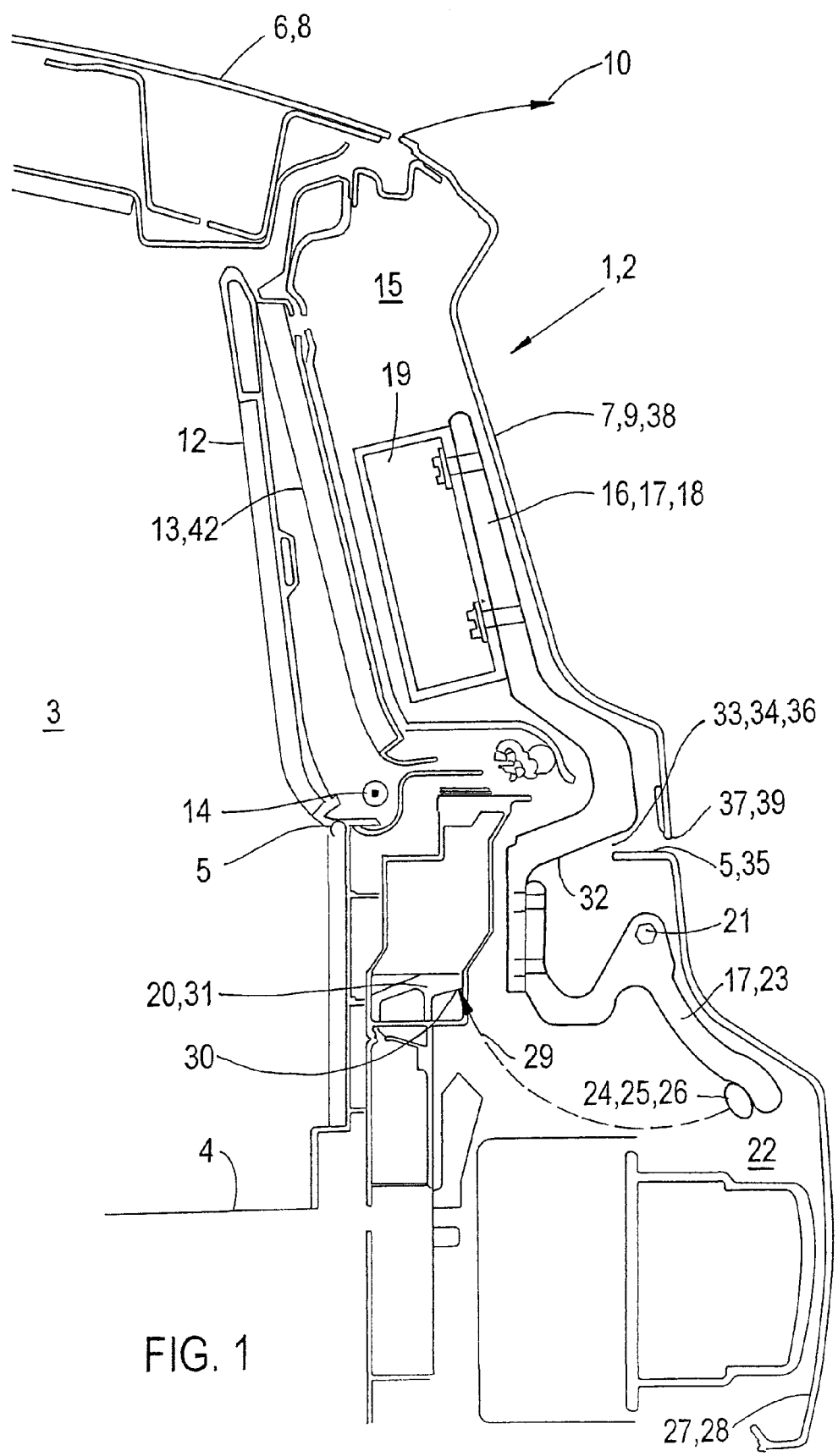
FIG. 1 is a longitudinal section view through a rear end of a vehicle having a lower trunk lid arranged on the rear end at the level of a hinge, via which hinge the lower trunk lid is connected at one end to an auto body wall, the lower trunk lid being shown in its closed state.

FIG. 1 shows a sectional view of a rear end 2 of vehicle 1. A trunk 3 is provided in the rear 2. The trunk 2 is enclosed by an auto body 4. The auto body 4 has an auto body cutout opening 5, which can be closed by an upper trunk lid 6 and a lower trunk lid 7.

The upper trunk lid 6 and lower trunk lid 7 in FIG. 1 are each situated in a closed position 8, 9. The lower trunk lid 7 can be pivoted downward by an angle α from the closed position 9 into an opened position 11. An arrow 10 shows the pivot direction, in which the lower trunk lid 7 moves, in order to arrive in the opened position 11 depicted in FIG. 2 and FIG. 6.

The lower trunk lid 7 has at least one strut-like locking component 12, which is arranged on a back 13 of the lower trunk lid 7 to pivot around a pivot axis 14, directed toward a trunk 3.

An upper arm 16 of a pivot lever 17 extends into a cavity 15 of the lower trunk lid 7. A free end 18 of the upper arm 16 is fastened to a transverse profile 19. The transverse profile 19 serves to increase the stability of the lower trunk lid 7, especially in a rear end crash.

The pivot lever 17 can be pivoted around a pivot axis 21 arranged on an auto body section 20. A lower arm 23 of pivot lever 17 extends into a cavity 22 of the lower auto body section 20. A stop 25 is fastened on a free end 24. The stop 25 is provided, for example, with a rubber pad 26.

In the closed state 9 of the lower trunk lid 7, the free end 24 of the lower arm 23 is situated in front of an inside surface 27 of a panel component 28 of the auto body section 20. Opening of the lower trunk lid 7 pivots the lower arm 23 around pivot axis 21 in the direction of an arrow 29.

In the opened position 11 of the lower trunk lid 7, the stop 25 of the lower arm 23 of pivot lever 17 lies against the stop 30, which is formed on an auto body wall 31 facing the trunk 3.

The upper arm 16 of the pivot lever 17, in conjunction with its connection to pivot axis 21, has an essentially U-shaped section 32. Section 32 is shaped, so that in the opened position 11 of the lower trunk lid 7, the section 32 can be pivoted out from passage opening 33 formed in the auto body section 20, while allowing for sufficient distance to be present between the outer edge 34 of the passage opening 33 and the closed position 9 of the lower trunk lid 7. In addition, section 32 is designed to allow for sufficient distance to be present between section 32 and an outside surface 35 on the upper end 36 of auto body section 20.

A lower end 37 of a panel component 38 of the lower trunk lid 7 is spaced by a gap 39 from the outer surface 35 of the panel component 28 of auto body section 20. The lower end 37 of the panel component 28 in the opened position 11 of the lower trunk lid 7 is spaced accordingly by a gap 39 to the outer surface 35 of the panel component 28.

Figure 2:
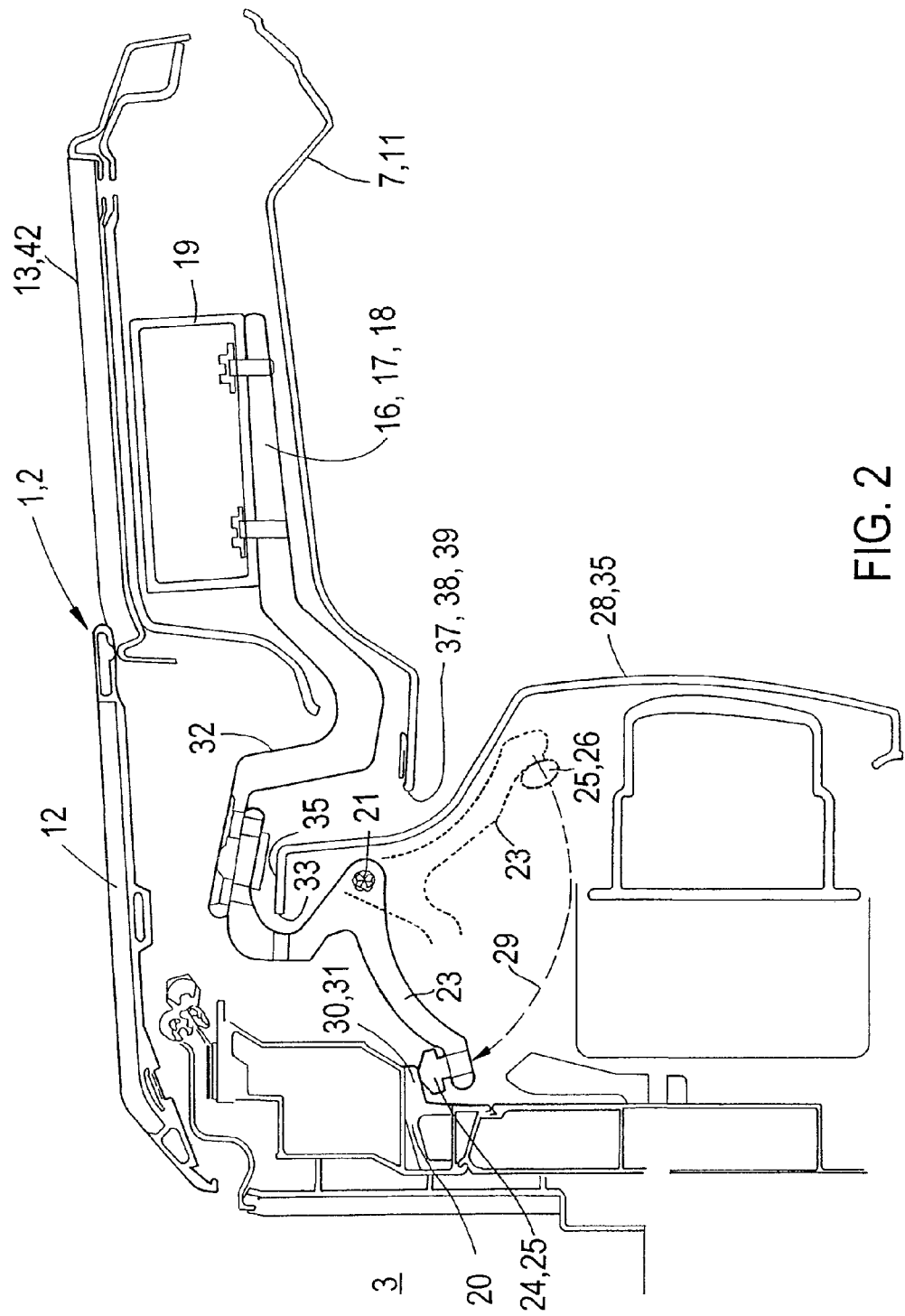
FIG. 2 is a longitudinal section view according to FIG. 1, in which the lower trunk lid is shown in an end position of its opened state.

FIGS. 3 to 6 show longitudinal sectional views relative to the hinge which, in contrast, is spaced from the longitudinal section view in FIGS. 1 and 2.

Figure 3:
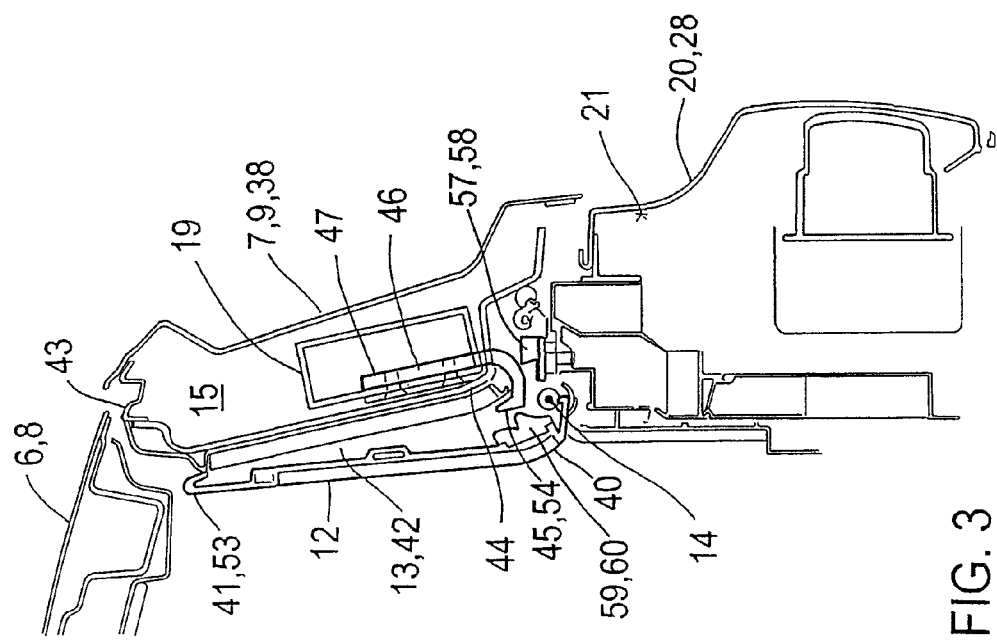
FIG. 3 is a longitudinal section view through the rear end of the vehicle having a lower trunk lid arranged on it, spaced relative to a hinge, the lower trunk lid being shown in a closed position.

FIG. 3 shows the lower trunk lid 7 in the closed position 9. The locking component 12 can be pivoted on its lower end 40, via pivot axis 14, to rotate on the lower auto body section 20 on a back 13 which, in the closed position 9, faces toward trunk 3.

A free upper end 41 of the locking component 12 lies on an outer surface 42 of the lower trunk lid 7 facing toward trunk 3 with a torque acting in the opening direction 10. The torque acting on the locking component 12 is produced, for example, via at least one spring (not shown). As an alternative or in addition, the locking component 12 can be locked in the position lying against outer surface 42 via a locking device (not shown), which is arranged, for example, on the upper free end 43 of the lower trunk lid 7.

A free end 45 of a second locking component 46 extends on an end 44 of the lower trunk lid 7 opposite the upper free end 43 at the level of the lower end 40 of the locking component 12 via an outer surface 42 of the lower trunk lid 7. An end 47 opposite the free end 45 of the second locking component 46 is fastened in the depicted variant on the hollow profile 19 in the cavity 15 of the lower trunk lid 7. After unlocking of the lower trunk lid 7, the locking present between the locking component 12 and the lower trunk lid 7 is simultaneously released.

Figure 4:
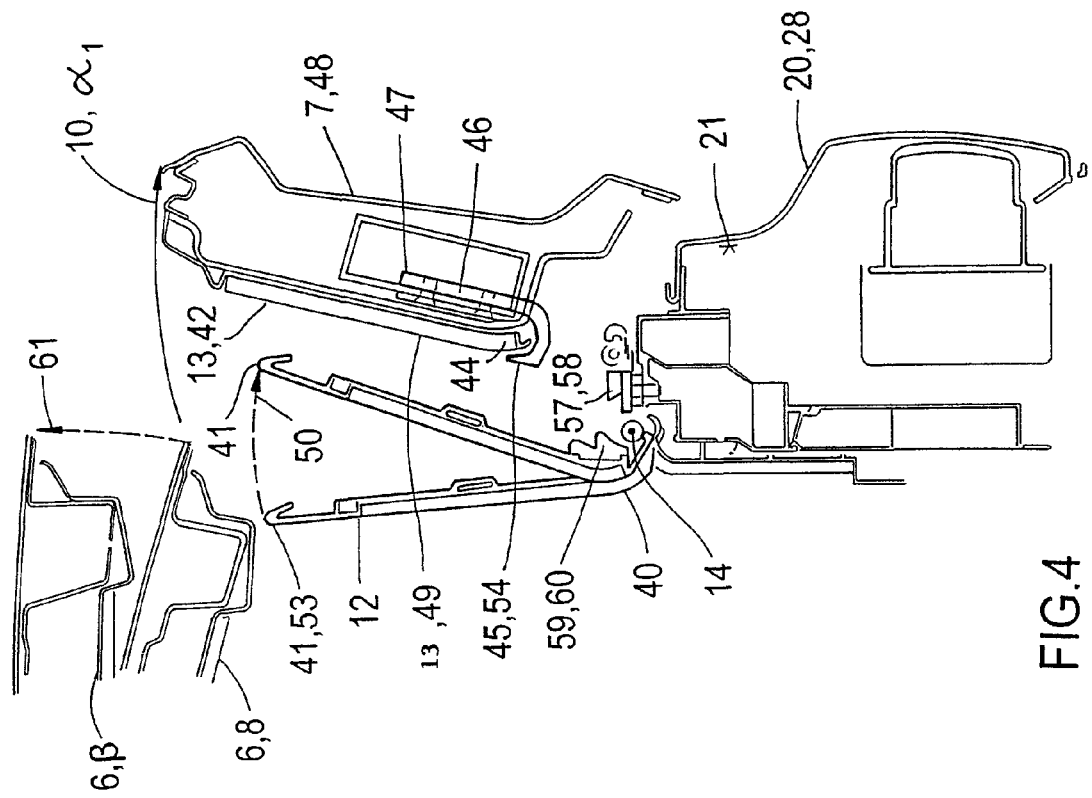
FIG. 4 is a longitudinal section view according to FIG. 3, in which the lower trunk lid is shown in a partially opened state in a first intermediate position with a pivot angle α1.

FIG. 4 shows an intermediate position 48 of the lower trunk lid 7 and the locking component 12. The lower trunk lid 7 then pivots around pivot axis 21. An arrow 50 symbolizes the opening direction of the locking component 12. An arrow 61, shown with a dashed line, indicates the opening direction of the upper trunk lid 6, which can be pivoted by a pivot angle β into an opened position.

A stop 57 is provided on the auto body section 20 relative to the corresponding lower end 40 of the locking component 12. A hook-like section 58 is formed on the corresponding stop 57. A stop 59 is also provided on the lower end 40 of the locking component 12, which has a hook-like section 60. In the opened position 11 of the lower trunk lid 7, hook-like sections 58, 60 of stops 57, 59 engage one another.

Figure 5:
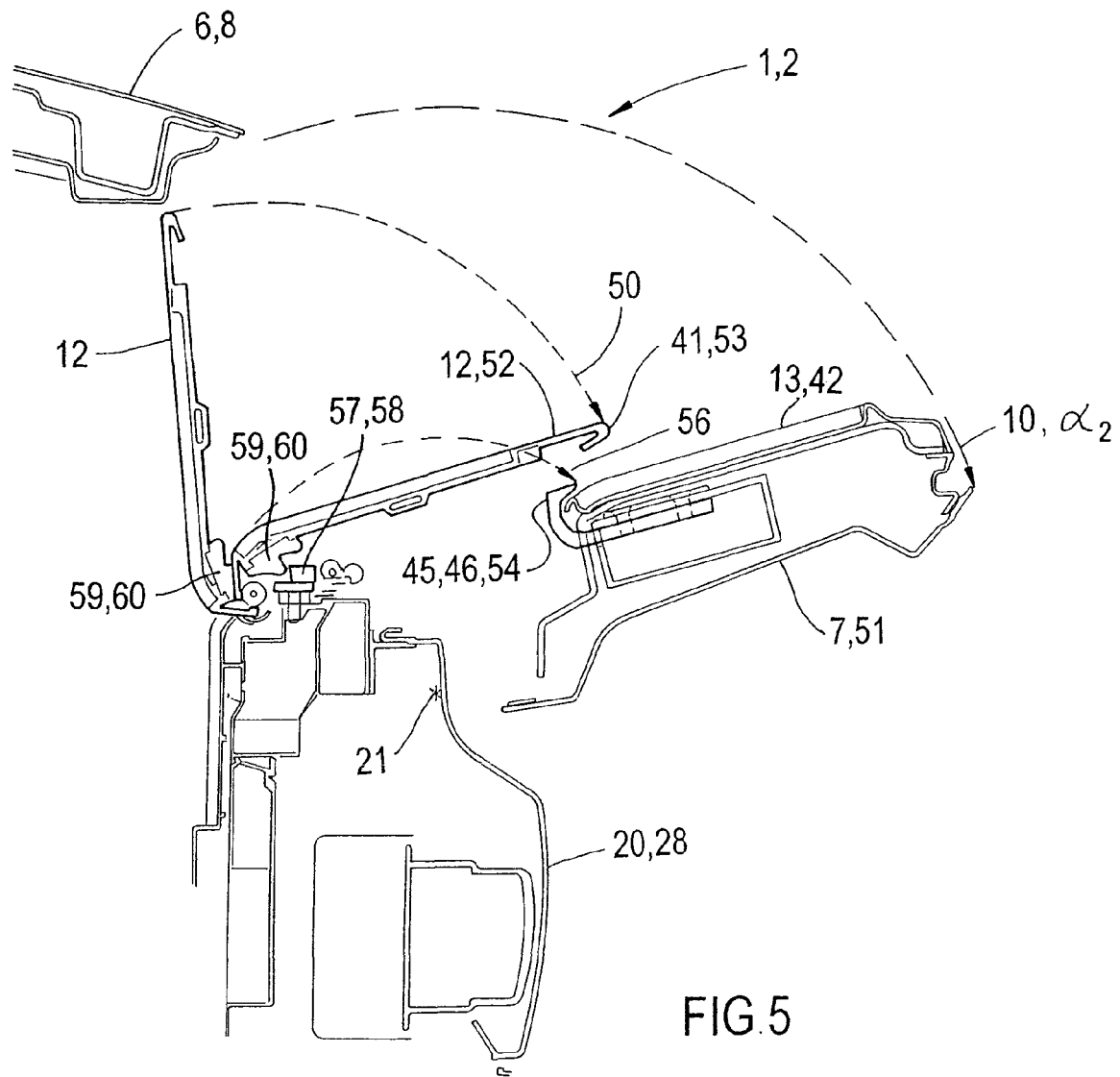
FIG. 5 is a longitudinal section view according to FIG. 4 in a second intermediate position at a larger pivot angle α2.

FIG. 5 shows another intermediate position 51 of the lower trunk lid 7 and an intermediate position 52 of the locking component 12. It is apparent from FIG. 5 that the free end 41, which has a hook-like section 53, has approached a hook-like section 54, which is formed on the free end 45 of the second locking component 46. In this intermediate position 51, no locking has yet occurred between the hook-like section 53 of the locking component 12 and the hook-like section 54 of the second locking component 46.

As follows from FIG. 5, the hook-like section 54 of the second locking component 46 describes a circular arc around pivot axis 21, which is shown in FIG. 5 by an arrow 56 with dashed lines.

Figure 6:
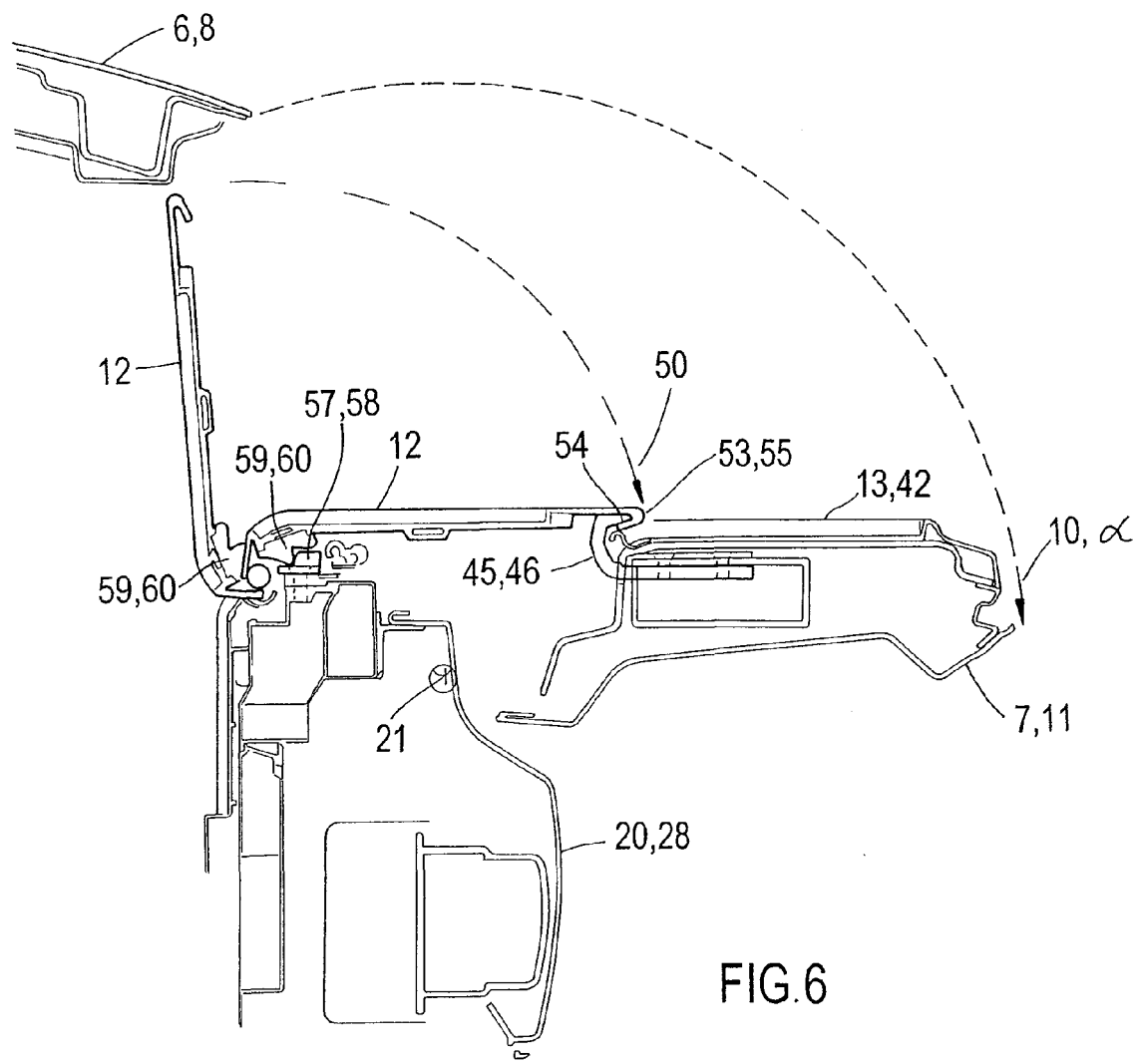
FIG. 6 is a sectional view according to FIG. 3, in which the lower trunk lid is in its fully opened position, wherein locking between a locking component and a hook-like end section on the back of the lower trunk lid has occurred.

The trunk lid 7 in FIG. 6 is situated in the fully opened position 11. Locking between the hook-like section 53 of the first locking component 12 and the hook-like section 54 of the second locking component 46 occurs simultaneously, so that the two locking components 12, 46 are situated in a locked position 55.

In one variant, at least two locking components 12 and two corresponding locking components 46 are provided at a spacing relative to each other. In the opened position 11 of the lower trunk lid 7, the corresponding locking components 12 are situated, and the corresponding locking components 46 are in a locked position 55 relative to each other.

The corresponding locking component 12 in the locked position 55 in the opened position 11 of the lower trunk lid 7 acts as a component that can be loaded in tension. The transferable tensile force is then introduced from the lower trunk lid 7 via the corresponding locking component 46, of the locking component 12 locked with it, into the auto body section 20.

Through the corresponding locking component 12, a situation is achieved in which the lower trunk lid 7 can handle a higher load in its fully opened position 11. Cargo can therefore be placed on the lower trunk lid 7 in the opened position 11. The corresponding pivot lever 17 can also be dimensioned smaller, because of the corresponding locking component 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A vehicle having a cutout opening in an auto body for a trunk of the vehicle, the vehicle comprising:
   a two-part trunk lid operatively configured to close-off the auto body cutout opening, the two-part trunk lid com- prising an upper trunk lid and a lower trunk lid; wherein the upper trunk lid is pivotable upward by a defined angle and the lower trunk lid is pivotable by a second defined angle from a closed position into an open position; and at least one pivot lever operatively configured to pivot about a first pivot axis formed on a lower auto body section, wherein the lower trunk lid is pivoted via the at least one pivot lever;

wherein the pivot lever comprises a lower pivot arm having a lower free end and an upper pivot arm having an upper free end; and wherein the pivot lever engages with the lower auto body section when the lower trunk lid is in the open position.

2. The vehicle according to claim 1, wherein a stop is operatively arranged on the lower free end of the lower pivot arm; and wherein the stop abuts against a further stop provided on an auto body wall of the lower auto body section when the lower trunk lid is in the open position.

3. The vehicle according to claim 2, further comprising:

a first locking component operatively arranged on the lower auto body section pivotable about a second pivot axis; and a second locking component operatively configured with the lower trunk lid, the second locking component being in shape-mated engagement with the first locking component when the lower trunk lid is in the open position.

4. The vehicle according to claim 3, wherein in a locked position when the first and second locking components are in shape-mated engagement with one another, tensile forces from a loading of the lower trunk lid in the open position are introduced into the lower auto body section via the locking components.

5. The vehicle according to claim 3, wherein the first locking component includes a first hook-like section formed on a free end of the first locking component, and wherein the second locking component fastened to the lower trunk lid includes a second hook-like section formed on a free end of the second locking component; and further wherein the first and second hook-like sections mutually engage one another in a locked position of the first and second locking components.

6. The vehicle according to claim 3, further comprising:

a stop provided on the lower auto body section, the stop having a hook-like section;

a further stop operatively arranged opposite the stop, the further stop being provided on an end section of the first locking component and having a further hook-like section; and wherein the hook-like sections of the stops engage one another when the lower trunk lid is in the open position.

7. The vehicle according to claim 2, wherein the upper pivot arm of the pivot lever is fastened to the lower trunk lid.

8. The vehicle according to claim 1, further comprising:

a first locking component operatively arranged on the lower auto body section pivotable about a second pivot axis; and a second locking component operatively configured with the lower trunk lid, the second locking component being in shape-mated engagement with the first locking component when the lower trunk lid is in the open position.

9. The vehicle according to claim 8, wherein in a locked position when the first and second locking components are in shape-mated engagement with one another, tensile forces from a loading of the lower trunk lid in the open position are introduced into the lower auto body section via the locking components.

10. The vehicle according to claim 9, wherein in the open position, the lower trunk lid handles higher loads via the locking of the first and second locking components and via the engagement of the pivot lever on an auto body wall of the lower auto body section, whereby cargo is placeable on the lower trunk lid in the open position.

11. The vehicle according to claim 8, further comprising means for producing a torque on the first locking component to pivot the first locking component in an opening direction of the lower trunk lid.

12. The vehicle according to claim 8, wherein the first locking component includes a first hook-like section formed on a free end of the first locking component, and wherein the second locking component fastened to the lower trunk lid includes a second hook-like section formed on a free end of the second locking component; and further wherein the first and second hook-like sections mutually engage one another in a locked position of the first and second locking components.

13. The vehicle according to claim 8, further comprising:

a stop provided on the lower auto body section, the stop having a hook-like section;

a further stop operatively arranged opposite the stop, the further stop being provided on an end section of the first locking component and having a further hook-like section; and wherein the hook-like sections of the stops engage one another when the lower trunk lid is in the open position.

14. The vehicle according to claim 1, wherein the upper pivot arm of the pivot lever is fastened to the lower trunk lid.

15. The vehicle according to claim 14, further comprising:

a cavity in the lower trunk lid;

a transverse profile arranged in the cavity of the lower trunk lid, wherein the upper pivot arm of the pivot lever is fastened to the transverse profile.

16. The vehicle according to claim 15, wherein the transverse profile is operatively configured to absorb impact forces acting upon the lower trunk lid.

17. The vehicle according to claim 14, wherein the upper pivot arm is configured to have an essentially U-shaped section, the U-shaped section being configured such that the upper pivot arm is freely pivotable around an outer edge of an upper end of the lower auto body section.

18. The vehicle according to claim 1, wherein the lower trunk lid comprises a suspension and cushioning support for at least one of the opening and closing of the lower trunk lid.

* * * * *